United States Patent
Leblanc

Patent Number: 5,822,116
Date of Patent: Oct. 13, 1998

[54] HIGH-ACCURACY ROTATION CONTROL DEVICE, IN PARTICULAR FOR TELESCOPES

[75] Inventor: Jean Marc Leblanc, Peymeinade, France

[73] Assignee: Aerospatiale Societe Nationale Industrielle, Paris, France

[21] Appl. No.: 573,782

[22] Filed: Dec. 18, 1995

[30] Foreign Application Priority Data

Dec. 22, 1994 [FR] France .................................. 94 15486

[51] Int. Cl.$^6$ .............................. G02B 23/00; F16M 1/00
[52] U.S. Cl. .......................................... 359/430; 248/638
[58] Field of Search .................... 359/430, 399, 359/429; 248/638

[56] References Cited

U.S. PATENT DOCUMENTS

| | | |
|---|---|---|
| 3,942,865 | 3/1976 | Rand . |
| 4,318,522 | 3/1982 | Appleberry .............................. 248/178 |
| 4,541,294 | 9/1985 | Byers ...................................... 74/89.14 |
| 4,683,391 | 7/1987 | Higuchi .................................. 310/90.5 |
| 4,723,075 | 2/1988 | German . |
| 4,764,881 | 8/1988 | Gagnon .................................... 364/559 |
| 4,771,545 | 9/1988 | Hisayasu et al. .......................... 33/299 |
| 4,849,666 | 7/1989 | Hoag ....................................... 310/90.5 |
| 5,368,271 | 11/1994 | Kiunke et al. ............................ 248/638 |

FOREIGN PATENT DOCUMENTS 525 128   10/1982   Australia .

OTHER PUBLICATIONS

Patent Abstracts of Japan vol. 11, No. 88 (E–490) JP–A–61 240866 (Nippon Denso Co Ltd).

*Primary Examiner*—Thong Nguyen
*Assistant Examiner*—Mark A. Robinson
*Attorney, Agent, or Firm*—Evenson, McKeown, Edwards & Lenahan, P.L.L.C.

[57] ABSTRACT

A drive device for rotating a main mobile assembly relative to a support about a rotation axis includes an intermediate mobile assembly rotated about the same rotation axis. A small travel linear electromagnetic drive device operates tangentially between the intermediate mobile assembly and the mobile assembly, being controlled in accordance with the position of the main mobile assembly relative to the support. A large travel drive device rotates the intermediate mobile assembly relative to the support in accordance with the relative position of the intermediate mobile assembly and the main mobile assembly. End stops delimit predetermined movement of the main mobile assembly relative to the intermediate mobile assembly.

2 Claims, 5 Drawing Sheets

HIGH-ACCURACY ROTATION CONTROL DEVICE, IN PARTICULAR FOR TELESCOPES

BACKGROUND OF THE INVENTION

1. Field of the Invention

The invention concerns controlling a rotation movement with great accuracy, in particular characterised by very high resolution and a very wide bandwidth for vibrations that can be compensated. It is directed in particular, although not exclusively, to controlling movement in azimuth and/or in elevation of an astronomical telescope.

2. Description of the Prior Art

A high-accuracy drive system, such as that of the axis of a telescope mount, for example, must have specific qualities. To obtain the required high-accuracy movement, the mobile part of the drive mechanism must in particular be carried by bearings that are as perfect as possible, i.e. that do not cause any movement errors due to lack of kinematic precision or to unwanted forces due to friction in the bearings.

Another source of unwanted forces is the connection of the high-accuracy mobile assembly to its environment, in the form of electrical cables or fluid hoses, which are never perfectly flexible.

The qualities of the motor driving the mobile assembly must meet the requirements stated above; in particular, the motor must supply a drive torque whilst effectively minimizing unwanted forces that could disturb the movement.

The motor must generate a torque that is as perfect as possible, i.e. that is dependent only on the command signal, in a perfectly linear manner, and within the bandwidth of the automatic control system.

This torque must be independent of the angular position of the mobile assembly.

One solution often adopted is to use a torque motor mounted directly on the axis concerned. Motors having the qualities mentioned above are commercially available. However, problems occur in the case of large motors.

The production of high electromagnetic torques requires large mechanical structures that cannot be perfectly rigid. These structures are subjected to radial electromagnetic forces, possibly of high magnitude, and in practice varying in magnitude, generated either directly by the operation of the motor itself or indirectly within the bearings (because of unintentional variations in the airgap within the bearings if the latter are of the magnetic type, for example).

All these phenomena become more serious as the machine becomes larger. This applies to astronomical telescopes, for example, which in the future will have dimensions such that, in this technological configuration, motors with a diameter of several meters will be required.

At present there is virtually no other market for motors of this size and it would be unthinkable to add to the cost of the astronomical equipment the research and development costs in this highly specific area for which there is an extraordinarily limited market.

Other problems have also to be solved if the direct drive principle is to be employed: for the reasons mentioned above, the size of these motors will remain limited and it will not be possible to provide motors having the excess torque capacity required to respond to all exceptional cases, for example earth tremors and even unpredictable gusts of wind.

In astronomical applications the speeds of travel are very low. The masses of these motors are enormous and, consequently, the copper heat losses are several tens of times greater than the mechanical power output.

It is also necessary to consider the hypothesis of unplanned failure of electrical power supply and to design safety devices to immobilize mechanisms of this kind, which can weigh several hundred tonnes, smoothly and safely, especially as these mechanisms may be damaged by accelerations caused by contact with an end stop, for example.

Moreover, auxiliary devices must track the movement of these high-accuracy mechanisms to enable connection of various pipes without generating high levels of disturbing torque.

An object of the invention is to alleviate the aforementioned drawbacks by providing a rotary drive system capable of generating high torques to move large masses with great accuracy and without requiring massive structures that are as heavy, large and costly as in the prior art solutions and which take maximum advantage of existing technology, this system assuming a highly rigid configuration in response to an incident without damage to the system.

SUMMARY OF THE INVENTION

To this end, the invention proposes a drive device for rotating a main mobile assembly relative to a support about a rotation axis, including:

an intermediate mobile assembly provided with guiding means for rotating it about the rotation axis, a large travel drive device for rotating the intermediate mobile assembly relative to the support, means for guiding rotation of the main mobile assembly relative to the support, a linear electromagnetic drive device having a small travel on either side of a reference configuration disposed to operate tangentially between the intermediate mobile assembly and the main mobile assembly, end stops delimiting predetermined movement of the main mobile assembly relative to the intermediate mobile assembly, sensing means for supplying a signal representative of the angular position of the main mobile assembly relative to the support, a servocontrol loop connected between the sensing means and the linear electromagnetic drive device and receiving a set point value; and a servocontrol loop operating on the large travel drive device according to the relative angular position of the main mobile assembly and the intermediate mobile assembly to maintain the linear electromagnetic drive device in a reference configuration.

It will be realized that, unlike the prior art, in which rotary motors are essentially used for rotary motion movement, the invention uses linear motion solutions with a greater or lesser degree of curvature.

At least some of the following preferred features of the invention may be combined with others:

the large travel drive device includes a motor-driven rolling member rolling on a curved track centered on the rotation axis, the large travel drive device includes a motor-driven pinion meshing with a curved rack centered on the rotation axis, the motor-driven pinion is carried by the support and the curved rack is carried by the intermediate mobile assembly, the motor-driven pinion is carried by the intermediate mobile assembly and the rack is carried by the support, the rotation axis is vertical and the support includes a cylindrical guide wall and at least one annular track on which the intermediate mobile assembly and the main mobile assembly rest, the intermediate mobile assembly and the main mobile assembly rest on the support via contactless bearings, the cylindrical track includes the notched portion with which a motor-driven pinion mounted on the intermediate mobile assembly meshes, the large travel drive device includes a plurality of equiangularly distributed rolling members rolling on the curved track, the rotation axis is at least approximately horizontal, the intermediate mobile assembly includes a rotary flange carrying a rolling track and a small travel linear electromagnetic drive device adapted to operate on the main mobile assembly, the intermediate mobile assembly includes two flanges disposed axially on either side of the main mobile assembly and each carrying a rolling track on one edge and each provided with a small travel linear electromagnetic drive device, each of the flanges include end stops for delimiting movement of the main mobile assembly relative to the intermediate mobile assembly, the small travel linear electromagnetic drive device is a loudspeaker coil type drive device.

The invention also proposes a telescope fitted with drive devices of this kind.

Objects, features and advantages of the invention emerge from the following description given by way of non-limiting example with reference to the appended drawings.

DETAILED DESCRIPTION OF THE PREFERRED EMBODIMENT

Figure 1:
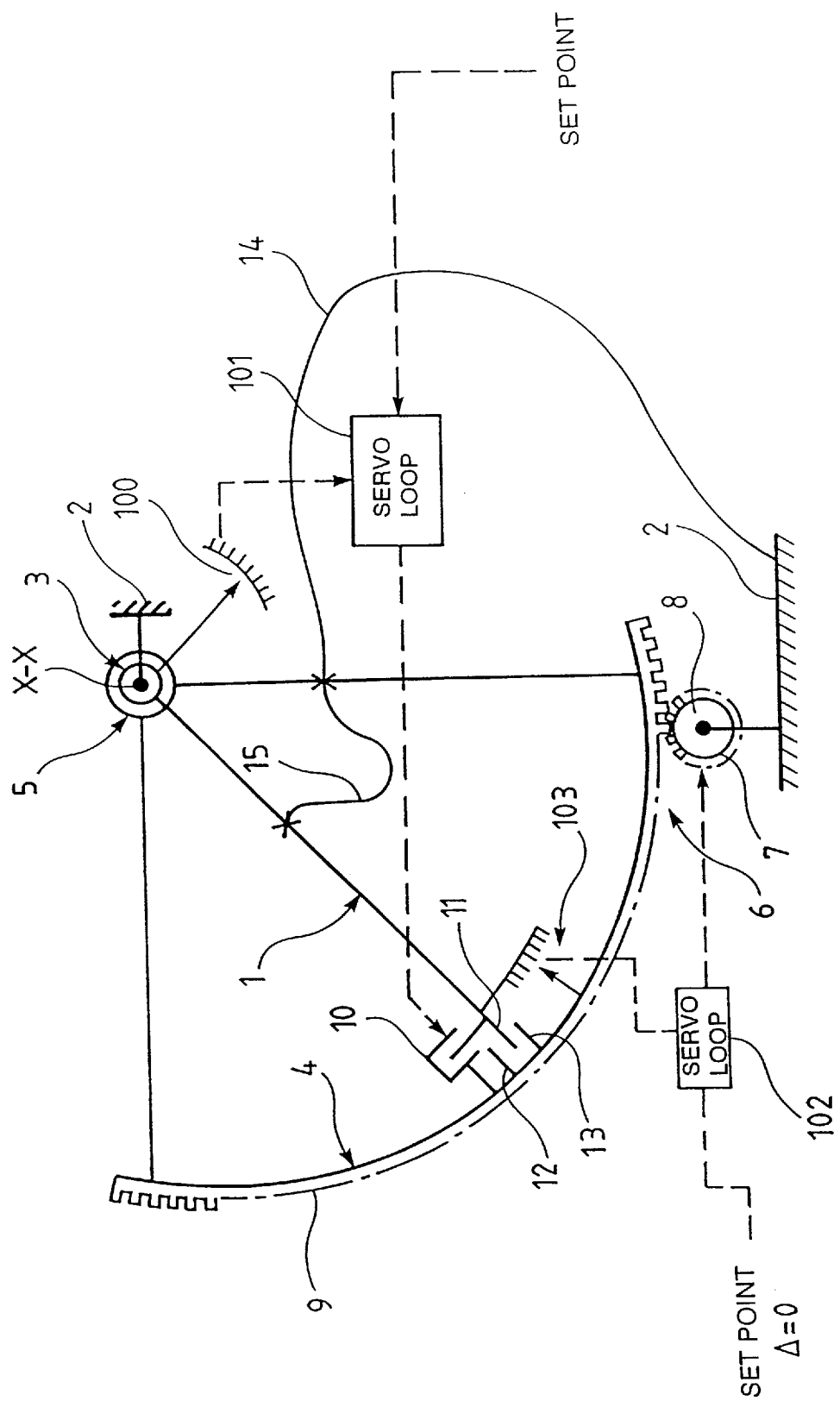
FIG. 1 is a diagrammatic view of a rotary drive system of the invention.

FIG. 1 is a diagram showing a mobile assembly 1 to be rotated with great accuracy relative to a support 2 about a rotation axis X—X.

The mobile assembly 1 has bearings 3 that are as perfect as possible, i.e. that provide the required accuracy of guidance with the minimum of disturbing friction. They are of any appropriate type known in itself (for example magnetic bearings or air bearings).

The mobile assembly 1 also has sensors 100 for monitoring this movement relative to the support with the required accuracy (angular coders, position and acceleration sensors, for example, of any appropriate type known in itself producing a signal representative of the instantaneous position of the mobile assembly).

Figure 5:
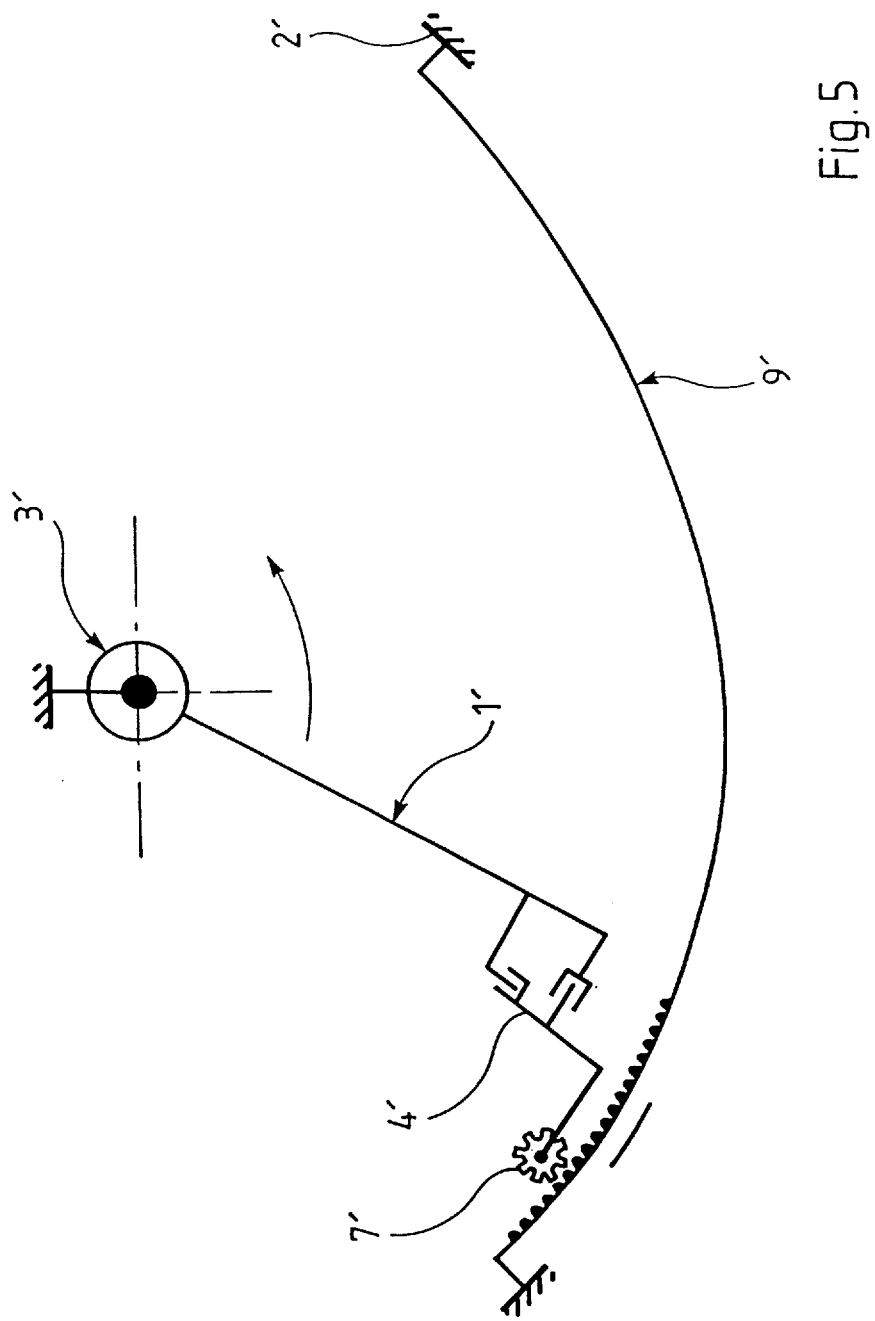
FIG. 5 shows a variant of FIG. 1.

The drive device comprises:

an auxiliary mobile assembly 4 adapted to perform the same rotation movement as the main mobile assembly but by virtue of an independent and conventional guide system (using standard bearings 5) and therefore not subject to the same demanding requirements as to accuracy, a motor 6 for driving the auxiliary mobile assembly 4 over a long distance relative to the support 2; this is advantageously a rack-and-pinion system; in FIG. 1 the pinion 7 is rotated by a conventional rotary motor 8 attached to the support and the curved rack 9, centered on the axis X—X, is coupled to the intermediate mobile assembly 4; in FIG. 5 the curved rack 9' is coupled to the support 2' and the pinion 7' is coupled to the intermediate mobile assembly 4'; as an alternative to this, the drive system 6 may include speed reducing gears, for example, and a high-speed brushless motor as conventionally used in the machine tool industry, together with associated servocontrol systems, a system rotationally coupling the mobile assemblies 1 and 4 including a "loudspeaker coil" type linear electromagnetic motor having a small travel on either side of a reference configuration, operating in parallel with a mechanical link 11 between end stops 12 and 13, normally with a clearance less than the travel of the motor 10, which provides a direct mechanical coupling in the event of failure of the electromagnetic motor 10.

The electrical and/or fluid connections required for operation of the auxiliary mobile assembly 4 and the main mobile assembly 1 utilize cable supports 14 and 15 in series connected together at a fixed point of the intermediate mobile assembly 4.

The drive system of the auxiliary mobile assembly is rated to drive it, the cable supports and the main mobile assembly.

The auxiliary mobile assembly 4 associated with a limited travel electromagnetic motor 10 referred to above therefore constitutes a rotary force generator or a rotary torque generator.

The electromagnetic motor 10 is controlled by a servocontrol loop 101 comparing the signals from the sensors 100 with set point values. The motor 8 is controlled by a servocontrol loop 102 comparing signals from sensors 103 mounted between the mobile assemblies 1 and 4 with set point values to keep the electromagnetic motor centered on its travel (in other words, its offset Δ relative to its center position must remain at 0). In this way the auxiliary mobile assembly 4 is slaved to and tracks the movement of the main mobile assembly 1.

Figure 2:
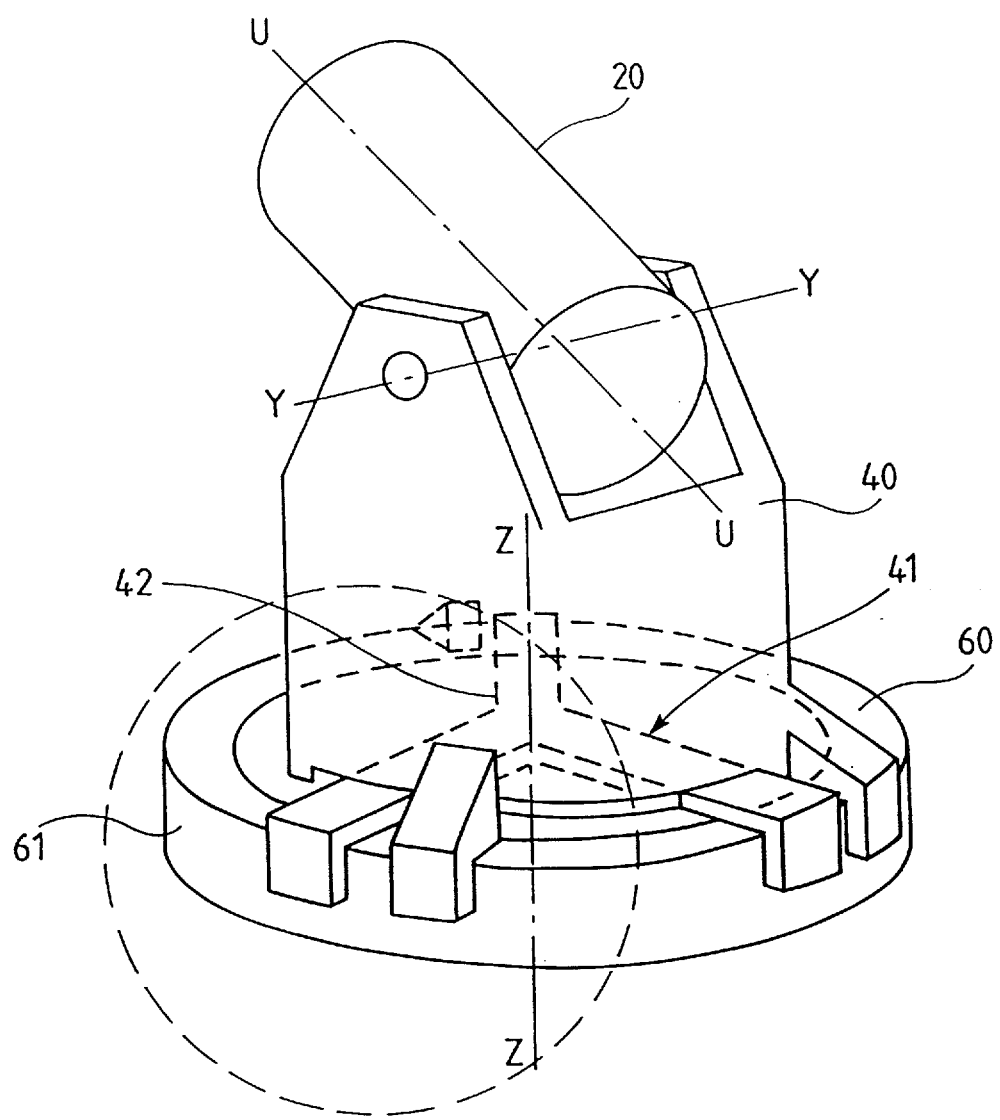
FIG. 2 is a diagrammatic perspective view of a telescope mobile relative to a frame which is mobile relative to a base.

It is possible to use two diametrally opposed electromagnetic motors to provide the coupling between the two mobile assemblies (or even n motors 10 offset by 360°/n—FIG. 2 shows an example with three motors).

The resulting system as a whole combines solutions to the various problems previously mentioned arising from the application of direct drive motors; the torque or the force applied to the high-accuracy mobile assembly is perfectly defined in terms of its direction, its point of application and its magnitude and depends only on the current flowing through the coil of the motor 10 (provided that the link 11 is not in contact with its end stops).

In particular, imperfections in the displacement of the auxiliary mobile assembly with respect to all the axes (rotation axis+transverse axes) have no effect on the electromagnetic force applied by the motor. In the direction of the main movement, the effect of residual vibrations of the auxiliary mobile assembly is not transmitted to the main mobile assembly.

In response to any unforeseen event (overloading, for example) this system provides a direct mechanical coupling via the mechanical link of the main mobile assembly to the auxiliary mobile assembly, the rugged positive drive system of which constitutes a safe back-up at all times. Normal operation can resume as soon as the disturbing event ceases.

The travel of the electromagnetic motor merely absorbs the difference between the intended high-accuracy motion of the main mobile assembly and the kinematically less accurate and more severely fluctuating motion of the auxiliary mobile assembly.

This difference represents a few millimeters at most.

For example, the accuracy of the auxiliary movement is expressed in milliradians and the target accuracy for the main movement is one microradian.

It is therefore possible to design couplings between the two mobile assemblies, to connect the necessary feed cables and hoses to the main mobile assembly, that are very flexible because of their small travel. This minimizes the disturbing forces caused by these indispensable connections.

The invention thus uses linear force generators having a very small travel and the stator of which continuously tracks the movement with a kinematic approximation having no influence on the quality of the force produced.

The positive control and safety features of the positive drive auxiliary movement are much better than would otherwise be possible.

Note that there is no solid or elastic contact between the intermediate mobile assembly 4 and the main mobile assembly 1 that could cause mechanical noise.

The use of a "curved linear" motor enables great accuracy, the accuracy increasing with the distance of the motor from the rotation axis. This great accuracy is combined with a long lever arm effect (due to the distance to the axis) so that a high torque can be obtained even with a low-power motor.

Note that the accuracy of the loudspeaker drive coil is achieved over a long travel (that of the curved linear motor). In an alternative embodiment the curved linear motor may include a track on which friction rollers roll.

Note that each mobile assembly has its own drive system and its own guide system (bearings).

FIG. 5 is a variant of FIG. 1 in which the relative disposition of the rack and the pinion are reversed. Components similar to those in FIG. 1 are denoted by the same reference number but "primed".

Figure 3:
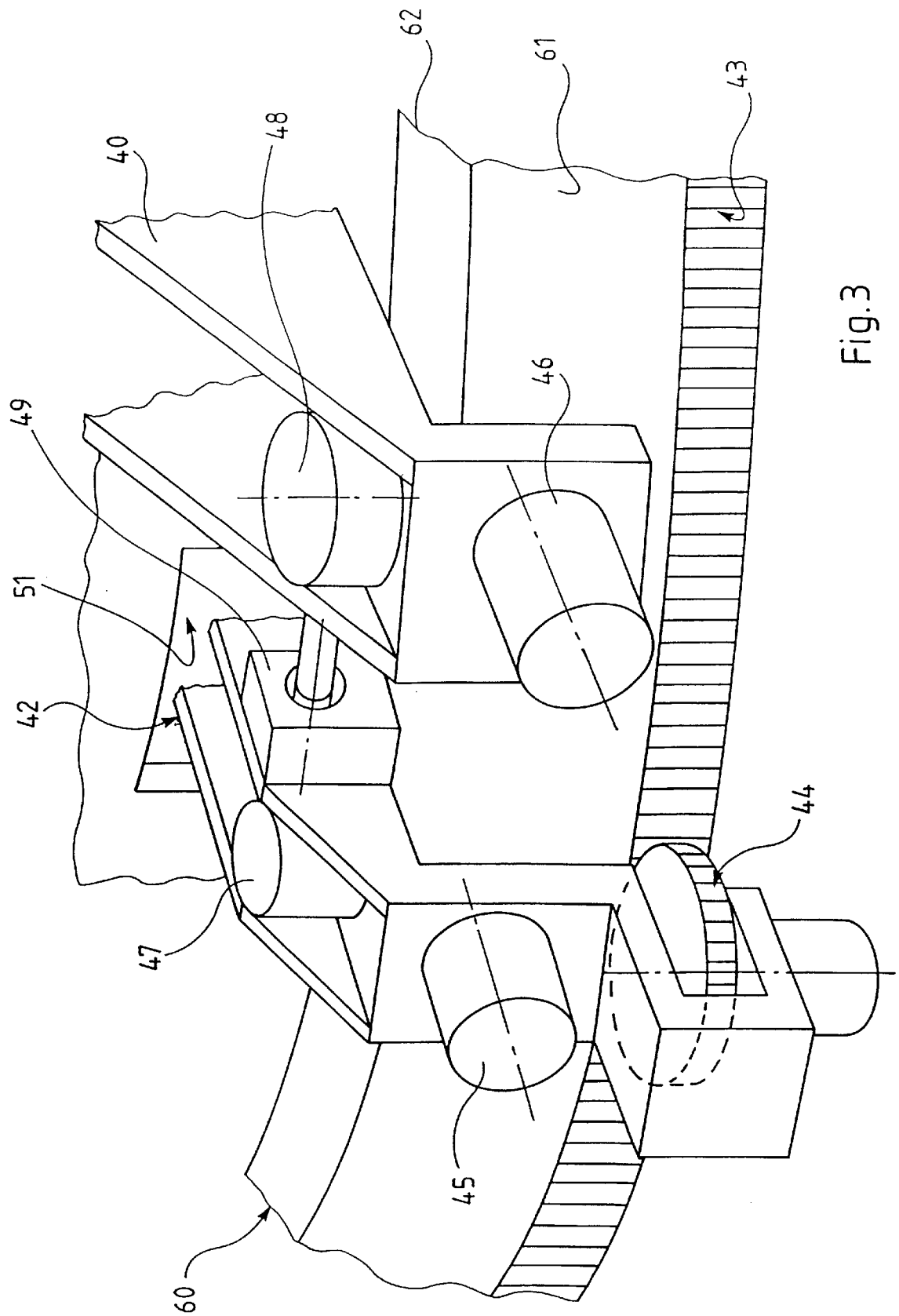
FIG. 3 is a view to a larger scale of part of FIG. 2 showing a device as shown in FIG. 1 for rotating the frame relative to the base about a vertical axis.
Figure 4:
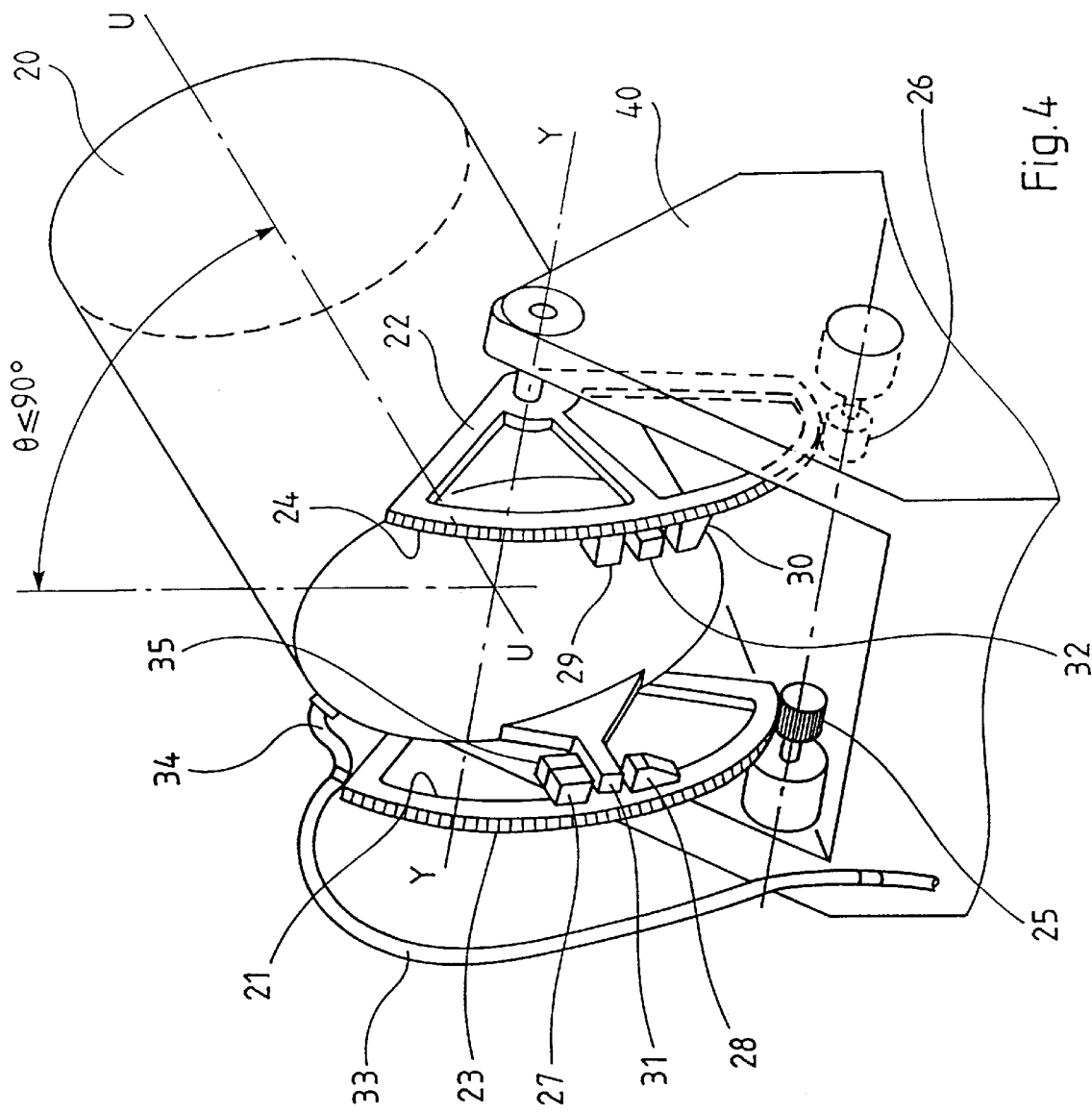
FIG. 4 is a diagrammatic view in perspective of a device as shown in FIG. 1 for rotating the mobile telescope relative to the frame about a horizontal axis.

FIGS. 2 through 4 show one example of application of the FIG. 1 principle to a telescope.

FIG. 2 shows a telescope mount 20 (including the sighting optics, axis U—U, not shown), a frame 40 on which the mount can rotate about a horizontal axis Y—Y, and a base 60 on which the frame can rotate about a vertical axis Z—Z.

These two rotation movements respectively determine the elevation and the azimuth of the telescope.

In the example given, each of these movements is imparted by a system as shown in FIG. 1 (or FIG. 5 as an alternative).

With reference to the azimuth movement, the frame 40 is mounted on the base 60 in parallel with an intermediate turntable 41 comprising radial arms; there are three radial arms 42 in this example (offset by an angle 360°/3). As can be seen clearly in FIG. 3, a notched track 43 on the base 60 meshes with a drive wheel 44 the axis of which is fixed to the end of one of the arms 42; there is preferably a drive wheel at the end of each arm. The wheel 44 is controlled by a control loop that is not shown.

The intermediate turntable 41 and the frame 40 include axial centering lugs cooperating with a cylindrical centering wall 61 of the base and advantageously provided, at least on the frame, with contactless bearings 45 and 46, for example hydrostatic bearings, adapted to minimize friction. Similarly, at least the frame 40 and preferably also the intermediate turntable 41 are supported on other contactless bearings 47 and 48, for example hydrostatic bearings. These bearings advantageously cooperate with a common transverse annular track 62.

Small travel linear electromagnetic motors 49 are disposed circumferentially between the intermediate turntable 41 and the frame 40.

The arms 42 are engaged in notches 51 in the frame the vertical sides of which form end stops for the motors 49.

The cable supports, the sensors and the servocontrol circuits or loops are not shown.

The movement can be through 360°.

FIG. 4 shows the drive system in elevation for an angular travel less than 90°.

An intermediate turntable is mounted by contactless bearings to rotate about the same axis Y—Y as the mount 20. In this example this turntable is divided into two independent lateral flanges 21 and 22. These flanges have notched edges 23 and 24 which form rolling tracks that cooperate with drive pinions 25 and 26 attached to the frame 40.

End stops 27 and 28, 29 and 30 restrict angular movement of radial levers 31 and 32 attached to the mount 20. Two small travel linear electromagnetic motors, only one of which, a motor 35, can be seen, are disposed tangentially to the rotation movement, between the flanges and the mount, in this example near the end stops 27 and 29.

Sections of cable supports 33 and 34 can be seen.

In an alternative embodiment, not shown, there can be only one flange.

It goes without saying that the foregoing description has been given by way of non-limiting example only and that numerous variants may be proposed by the person skilled in the art without departing from the scope of the invention.

There is claimed:

1. Telescope including a base, a frame mounted to rotate on said base about a vertical axis, a mount having a sight axis and mounted to rotate on said frame about a horizontal axis, and drive devices disposed between said base and said frame, and between said mount and said frame, said drive devices for rotating a main mobile assembly relative to a support about a rotation axis, including:

an intermediate mobile assembly provided with guiding means for guiding rotation of said intermediate mobile assembly about said rotation axis, a large travel drive device for rotating said intermediate mobile assembly relative to said support, means for guiding rotation of said main mobile assembly relative to said support, a linear electromagnetic drive device having a small travel on either side of a reference configuration disposed to operate tangentially between said intermediate mobile assembly and said main mobile assembly, end stops delimiting predetermined movement of said main mobile assembly relative to said intermediate mobile assembly, sensing means for supplying a signal representative of the angular position of said main mobile assembly relative to said support, a servocontrol loop connected between said sensing means and said linear electromagnetic drive device and receiving a set point value, and a servocontrol loop operating on said large travel drive device according to said relative angular position of said main mobile assembly and said intermediate mobile assembly to maintain said linear electromagnetic drive device in a reference configuration, wherein said rotation axis is vertical and said support includes a cylindrical guide wall and at least one annular track on which said intermediate mobile assembly and said main mobile assembly rest.

2. Telescope including a base, a frame mounted to rotate on said base about a vertical axis, a mount having a sight axis and mounted to rotate on said frame about a horizontal axis, and drive devices disposed between said base and said frame, and between said mount and said frame, said drive devices for rotating a main mobile assembly relative to a support about a rotation axis, including:

an intermediate mobile assembly provided with guiding means for guiding rotation of said intermediate mobile assembly about said rotation axis, a large travel drive device for rotating said intermediate mobile assembly relative to said support, means for guiding rotation of said main mobile assembly relative to said support, a linear electromagnetic drive device having a small travel on either side of a reference configuration disposed to operate tangentially between said intermediate mobile assembly and said main mobile assembly, end stops delimiting predetermined movement of said main mobile assembly relative to said intermediate mobile assembly, sensing means for supplying a signal representative of the angular position of said main mobile assembly relative to said support, a servocontrol loop connected between said sensing means and said linear electromagnetic drive device and receiving a set point value, and a servocontrol loop operating on said large travel drive device according to said relative angular position of said main mobile assembly and said intermediate mobile assembly to maintain said linear electromagnetic drive device in a reference configuration, wherein said intermediate mobile assembly includes a rotary flange carrying a rolling track and a small travel linear electromagnetic drive device adapted to operate on said main mobile assembly.

* * * * *